United States Patent [19]

Eloy et al.

[11] 4,322,629

[45] Mar. 30, 1982

[54] MASS SPECTROGRAPH

[75] Inventors: Jean-Francois Eloy, Saint Ismier, France; Eberhard Unsold, Munich, Fed. Rep. of Germany

[73] Assignees: Commissariat a l'Energie Atomique, Paris, France; Gesellschaft fur Strahlen und Umweltforschung mbH, Neuherberg, Fed. Rep. of Germany

[21] Appl. No.: 177,775

[22] Filed: Aug. 13, 1980

Related U.S. Application Data

[63] Continuation of Ser. No. 958,721, Nov. 8, 1978, abandoned.

[30] Foreign Application Priority Data

Nov. 15, 1977 [FR] France .................... 77 34271

[51] Int. Cl.³ .......................................... B01D 59/44
[52] U.S. Cl. .................................... 250/299; 250/399
[58] Field of Search ............... 250/368, 298, 299, 287, 250/281, 282, 391 R, 397, 363, 369, 399; 313/94, 103 R, 104

[56] References Cited

U.S. PATENT DOCUMENTS

| 2,798,162 | 7/1957 | Hendee | 250/299 |
| 3,538,328 | 11/1970 | Strausser | 250/399 |
| 3,676,674 | 7/1972 | Zaviantseff | 250/299 |
| 3,955,084 | 5/1976 | Giffin | 250/299 |

Primary Examiner—Bruce C. Anderson

[57] ABSTRACT

Mass spectrograph comprising an ion source, means for analyzing the ions emitted by this source and a panoramic ion detector, wherein the analysis means are of the type with magnetic separation and measurement of the time of flight and the ion source is a pulsed source.

The panoramic ion detector comprises an ion inlet diaphragm, means facing the diaphragm which permit the conversion of ions into electrons, means facing the means for converting the ions into electrons and permitting the conversion of electrons into photons, a photon detector facing the means for converting the electrons into photons and photon guidance means located between the means for converting electrons into photons and the photon detector whereby the photon guidance means have a monoblock structure.

17 Claims, 2 Drawing Figures

MASS SPECTROGRAPH

This is a continuation of application Ser. No. 958,721, filed Nov. 8, 1978 abandoned.

BACKGROUND OF THE INVENTION

The present invention relates to a mass spectrograph.

It is known that a mass spectrograph is an apparatus which produces ions from a substance to be analysed and then sorts these ions in accordance with the ratio M/e of their mass to their charge. This ratio makes it possible to very accurately determine the mass of each of the ions formed and count the number of ions of each species making it possible to establish the composition of the substance.

A mass spectrograph generally comprises an ion source, an ion analyser and a detector. The ion sources are either pulsed sources or continuous sources. The analysers may be of different types, so that a distinction is made between spectrographs with a magnetic analyser in which the analyser functions as a spatial separator for the ion species and spectrographs with an electrostatic analyser, generally associated with a magnetic analyser acting as a spatial separator. This ion analyser may also comprise a free space which is not subject to any field and which acts as a time separator for the ions. In this case, the spectrograph is generally described as being of the type with "separation in the time of flight".

In a magnetic analyser, the ions from the same object slot of the ion source and which have the same kinetic energy travel in circular trajectories, whose radii of curvature are in accordance with the formula:

$$R = \frac{m \cdot v}{e \cdot B}$$

In this formula, m designates the mass of 1 ion, v its velocity, e its charge and B the induction of the magnetic field to which the said ion is subject. Thus, the ion species are spatially separated.

In a time of flight analyser, all the ions initially have the same kinetic energy and they travel in the same trajectory x in a time t corresponding to formula:

$$t = X/v$$

in which v is the velocity of the ions.

This velocity is expressed by the formula:

$$v = \sqrt{\frac{2 \cdot E_c}{m}}$$

in which $E_c$ designates the kinetic energy of a considered ion.

In this type of analyser, the ion species are separated in time in accordance with the formula $t = k\sqrt{m}$, k designating a constant. Thus, a time of flight mass spectrograph can only function with a pulsed ion source. Thus, time $t_o$ at which the ions depart must be defined with a very great time resolution.

The mass spectrographs may also be classified in accordance with the types of detectors used. The type of detector is generally dependent on the type of analyser. In a mass spectrograph with a magnetic analyser or electrostatic analyser, coupled to a magnetic analyser, it is preferable to use a panoramic collection detector in order to increase the analytical potential of the spectrograph. Thus, in this case, it is necessary for the ionic optical system to have a large planar image surface formed from all the image points of each of the ion species from the same object slot.

In a time of flight mass spectrograph, the image point of the object slot is unique. Therefore, in this type of spectrograph, the detector used must have a very high response speed and at the same time an ion collecting surface of reduced dimensions. The photographic plate is the best known panoramic detector adapted to the spatial separation analysers. The photographic detector simultaneously collects all the ion species and integrates in time different signals collected. Its dynamics, which is the ratio of the maximum signal detected to the minimum signal detected, is of the order of $10^3$ to $10^4$. Its detection limit is $10^6$ ions/mm$^2$ and per detectable line. Its spatial resolution is of the order of a few micrometers. Although this detector has a good spatial resolution and a good sensitivity, it has the disadvantage of production and utilization difficulties. A considerable amount of time is required for developing, recording and the calibration curves of the photographic plates.

It is known to replace the photographic plate by a plurality of photomultipliers, each of which is sensitive to a single beam of ions of given mass. However, this system is heavy and cumbersome and in practice does not permit the separation of adjacent ion masses.

To obviate these disadvantages, it is known to replace the panoramic photographic detector or the multiple photomultiplier system by an ion-electron-photon converter applied to analysis by spatial separation. This converter is designed in such a way that it retains the spatial resolution of the mass spectrum collected on the focal surface of the ionic optical system. It comprises for example an electron amplifier microchannel plate in which the ion-electron conversion is performed directly when an ion strikes the inner wall of a channel. This plate has several thousand small channels, whose diameter is approximately 12 microns. These channels are juxtaposed and issue into a scintillator constituted by an aluminised phosphorescent layer permitting the conversion of the electrons from the channels into photons. The photons constituting the brightness information are transported by a certain number of light guides or optical fibres, which all converge towards a spectrum reading window. This spectrum must be read by means of a Vidicon sensing camera. This system is complicated and difficult to operate. Moreover, it requires a continuous collection of the spectrum to permit reading by sensing. It has a great sensitivity and retains a certain spatial resolution permitting the separation of the different masses to be detected and measured. However, it has the disadvantage of offering a surface with blind joints between each plate channel to the incident ion beams. Consequently, the conversion surface is discontinuous and there is a loss of spatial resolution and analytical information. Moreover, in the case of this type of plate there is a certain lack of information on the ion-electron conversion characteristics for different species. Therefore, the accuracy of the measurements is uncertain.

Another known spectrograph which uses a panoramic detector permitting analysis by spatial separation, as hereinbefore, uses an ion-electron-photon conversion. The ions are converted into electrons by means of a system of taut electrical wires or tapes on which the incident ion beams produce the emission of electrons. These electrons then strike individual scintillators which produce photons. These photons are channelled into individual light guides, such as optical fibres and then lead to an individual photomultiplier for each optical fibre. A spectrograph of this type, as hereinbefore, has a discontinuous conversion surface. There is therefore a loss of spatial resolution in the detection of ions. This spectrograph also has problems as a result of a large number of photomultipliers, particularly with regard to the overall dimensions, the quality of the vacuum obtained and the regulation of the operating temperature.

In order to eliminate this discontinuity in the spatial resolution of the spectrograph detectors, it is known to construct a conversion electrode with a continuous structure. This electrode is generally brought to negative potentials and the ions strike it without being previously accelerated in a defined space. This negative potential makes it possible to limit the capture of the ions and to eliminate rebound phenomena during the impact of said ions on the conversion electrode. The secondary electrons which are emitted as a result of the impacts are channelled by an electrical field perpendicular to the plane of incidence of the ion beams. These electrons are then collected on a photographic plate after passing through a diaphragm at earth potential. Although this spectrograph permits a continuous spatial resolution, it does not permit the elimination of the use of a photographic plate.

Thus, as can be gathered from the statements made hereinbefore, there is no known spectrograph which enables time of flight measurements to be made and which at the same time has a panoramic ion detector with a continuous structure, associated with a pulsed ion source.

BRIEF SUMMARY OF THE INVENTION

The problem of the present invention is to obviate these disadvantages and in particular to provide a spectrograph permitting spectral measurements based on the time of flight principle.

The present invention therefore relates to a mass spectrograph comprising an ion source, means for analysing the ions emitted by this source and a panoramic ion detector, wherein the analysis means are of the type with magnetic separation and measurement of the time of flight and the ion source is a pulsed source.

According to advantageous features, said pulsed source is a triggered laser source but it can also be a spark source.

According to another feature of the invention, the panoramic ion detector comprises an ion inlet diaphragm, means facing the diaphragm which permit the conversion of ions into electrons, means facing the means for converting the ions into electrons and permitting the conversion of electrons into photons, a photon detector facing the means for converting the electrons into photons and photon guidance means located between the means for converting electrons into photons and the photon detector.

According to a special feature, these photon guidance means have a monoblock structure and are made for example from a colourless synthetic resin.

BRIEF DESCRIPTION OF THE DRAWINGS

Other advantages and features of the invention can be gathered from the following non-limitative description of an embodiment and with reference to the attached drawings, wherein show.

DETAILED DESCRIPTION OF THE PREFERRED EMBODIMENTS

Figure 1:
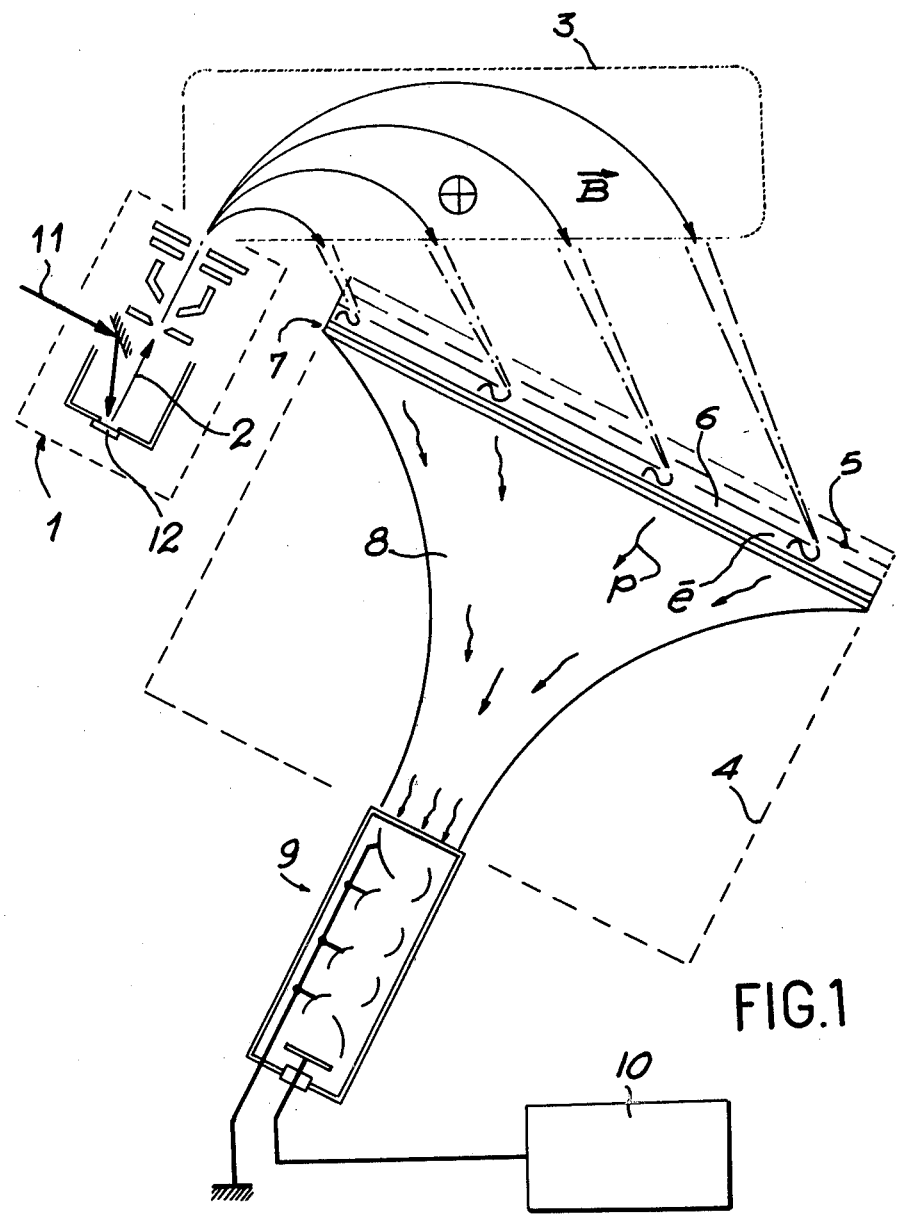
FIG. 1 a plan view in section of a spectrograph according to the invention.

FIG. 1 shows in plan view and in section a spectrograph according to the invention, which comprises an ion source 1 emitting a beam 2 in the direction of means 3 for analysing the ions emitted by the source. These analysis means essentially comprise means for producing a magnetic field, whose induction is indicated in the drawing by $\vec{B}$. These analysis means make it possible to ensure a spatial dissociation of the different ion species. Thus, the beam of ions is inflected and is dissociated in the manner shown in the drawing. The thus dissociated ions reach a panoramic ion detector 4 which, associated with analysis means 3, permits the realisation of the spectrograph according to the operating mode called "by magnetic separation and time of flight".

Thus, in this system, to each ionic mass corresponds a different transit length 1 whereby the smaller the ionic mass the smaller this transit length, while the smaller the ionic mass the smaller the transit time. This time of flight varies in accordance with the mass and not with the square root of the mass as in conventional time of flight spectrometers for analysis by free space without field.

The panoramic detector comprises an ion inlet diaphragm 5, associated with means 6 permitting the conversion of ions from the source into electrons $e^-$. A photon detector 7 faces the means 6 for converting electrons into photons. Means 8 for guiding the photons supplied by conversion means 7 make it possible to apply to a photomultiplier 9 all the photons corresponding to the ions produced by the source during a given time and as from a given moment. The output signals of the photomultiplier are applied to time recording means synchronised with means 10 for pulsating the ion source and visualising the photon spectrum, said means being conventional in time of flight spectrometry. These means comprise a cathode tube apparatus, recording as a function of time the signal from the photomultiplier which is rendered visible, whereby the appearance of the spectrum is directly obtained. They may comprise a time division system of the n different channels corresponding to each mass and a system for recording the values of the signals observed in the different channels in n storage units. Diaphragm 5, means 6 for converting ions into electrons, means 7 for converting electrons into photons and photon guidance means 8 will be described in greater detail hereinafter.

The pulsed ion source 1 is either a triggered laser source or a spark source. In the present embodiment, this source is a triggered laser source. The pulse-like laser beam 11 strikes the sample 12 to be studied by means of per se known optical means not shown in the drawing. The sample then emits an ion beam 2 which traverses various known elements ensuring the concentration and guidance thereof. These known means are not shown in the drawing. A triggered laser ion source of this type may be in accordance with that described in French Patent No. 1,580,234, filed on May 15, 1968 by the present Applicant. However, a monospark-type ion source may be used to replace the presently described source. Such a monospark source is described in French Patent Application No. 76 13145, filed on May 3, 1976 by the present Application.

Figure 2:
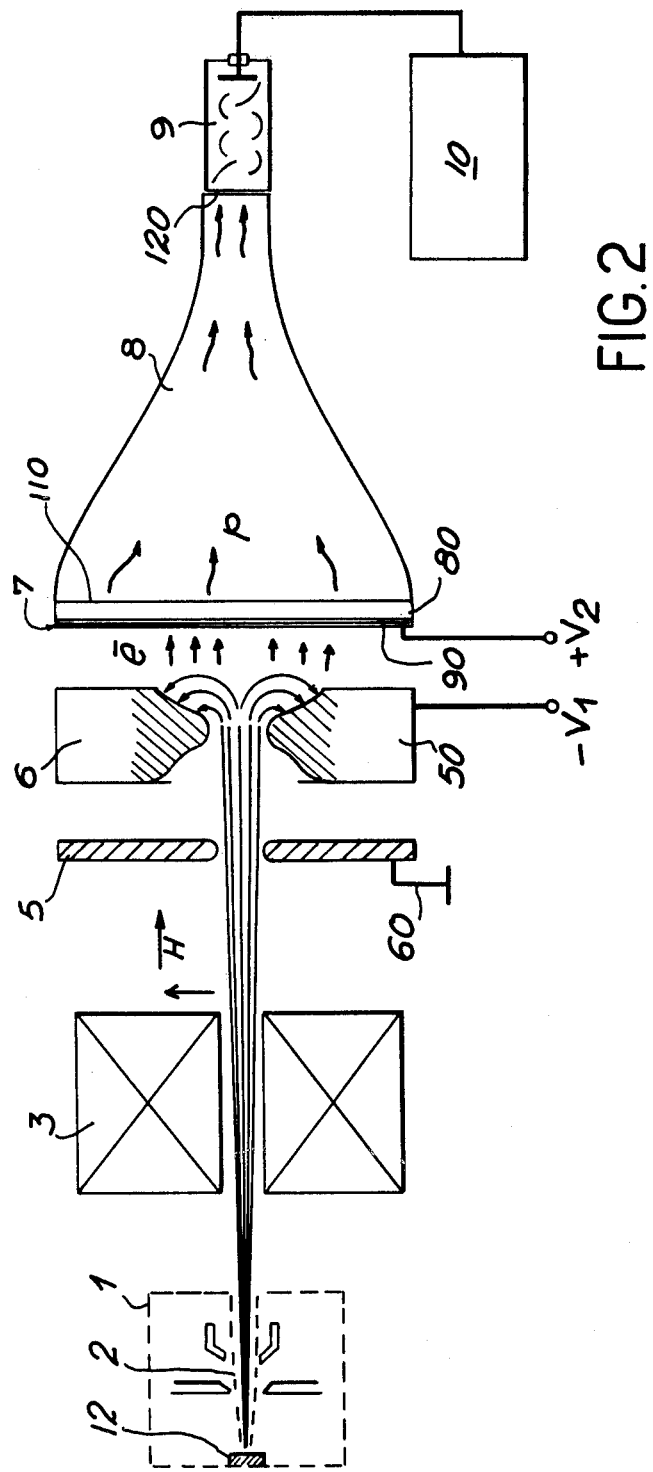
FIG. 2 a side view in section of the spectrograph of FIG. 1.

FIG. 2 shows from the side and in section the spectrograph of FIG. 1. Source 1 emits an ion beam 2 produced by the sample to be studied under the action for example of a triggered laser beam. This beam arrives at analysis means 3, constituted for example by the induction coils of a magnetic field H. This magnetic field makes it possible to partly dissociate the different ion species. At the outlet from means 3 the ions traverse the inlet diaphragm 5 before reaching means 6 permitting a conversion of ions into electrons. These conversion means have a continuous plane symmetry structure. Diaphragm 5 is brought to the potential of earth 60, while the conversion means 6 are brought to a negative potential $-V_1$, relative to earth potential. The means 6 for converting ions into electrons are in the form of electrodes, shown in sectional form in the drawing. These electrodes may be made from a copper-beryllium alloy. The electrical field produced due to the negative potential applied to these electrodes makes it possible to deflect the ion beam, as shown in the drawing. These ions pass between the edges of the electrodes and strike the latter on their upstream face. Secondary electrons are then emitted in the direction of means 7 which bring about a conversion of electrons into photons. These conversion means face the ion-electron conversion means 6. The electron-photon conversion means 7 comprise a scintillator with a planar structure having a plastic support 8 covered by a very thin aluminum film 90 facing the ion-electron conversion means 6. The aluminum film 90 is brought to positive potential $+V_2$ relative to earth potential. As an example, the negative potential $-V_1$ of the electrodes of the ion-electron conversion means is approximately $-10$ to $-15$ kV. The positive potential $+V_2$ of the scintillator is of the order of $+10$ to $+20$ kV. The thin aluminum film 90 covering plastic support 80 has a thickness equal to or below 200 Å.

The plastic support 80 of scintillator 7 faces the guidance means 8 for the photons emitted by scintillator 7. These photon guidance means have a monoblock structure and are made from colourless synthetic resin. This synthetic resin is a methyl methacrylate polymer known under the trade name plexiglass. The inlet face 110 of the guidance means faces the scintillator, while the outlet face 120 faces the photon detector 9, which for example comprises a photomultiplier.

The photon guidance means 8, having a monoblock structure permitting the transmission of photons from the scintillator to the photomultiplier converge in the direction of a window (not shown) of said photomultiplier.

Thus, there is no spatial discontinuity, neither in the detection of the ions, nor in the production and detection of photons on passing from one ion of given mass to the next.

The ions to be collected and detected are postaccelerated by an electrical field $\vec{E}$ applied between diaphragm 5 and the ion-electron conversion electrode 6 in such a way as to introduce these ions solely into the ion-electron separating space. When the ions enter this space, they are decelerated and deflected in such a way that they strike the surface of the conversion electrode from the side which faces scintillator 7 with a high kinetic energy. This trajectory is obtained through the application of a negative potential compared to earth to the electrode 6 and by the application of a positive potential compared with earth to the scintillator 7. The ions which strike the surface of the ion-electron conversion electrode 6 with a certain kinetic energy remove the secondary electrons from said electrode. These secondary electrons are accelerated and strike the aluminised surface of the scintillator. The impacts of the secondary electrons produce a scintillation phenomenon in the scintillator, which leads to emissions of photons. The face 110 of the photon guidance means 8 is in direct contact with the plastic support of the scintillator over an area equivalent to that of the ion-electron conversion electrode 6. The photons emitted by the scintillator are channelled and converge on an appropriate opening window of the photomultiplier 9 in such a way as to permit the reading of all the brightness information by means of visualisation means 10, linked with said photon detector. Light guide 8 which has a monoblock structure, permits a spatial mixing of all the photon information. As a result, it is possible to simultaneously read photon information due to a plurality of photomultipliers disposed on the same light guide.

The spectrograph described hereinbefore has the advantage of supplying a very fast analytical response. The interpretation of the mass spectrum is greatly simplified. The accuracy of the results is greatly improved. This spectrograph does not have the same danger of saturation which occurs in the case of spectrographs using a multichannel detector. This spectrograph also has the advantage of a detection limit which is approximately 1000 times greater than that of a spectrograph with a photographic detector. The mass spectrograph described hereinbefore and which utilizes a pulsed ion source makes it possible to realize a time of flight separation. This possibility is due to the use of panoramic detection and is instantaneous. The analytical response of this spectrograph is very rapid and the interpretation of the mass spectra, analysed in time of flight, is simplified. Thus, with this panoramic detection, the time separation of the mass spectrum is greater than that of a spectrograph with a single trajectory. In this spectrograph a different transit length corresponds to each ionic mass. The time of flight decreases in proportion to the ionic mass. As the detector has a continuous panoramic surface, there is no blind collecting surface and consequently no loss of signal representative of the ions to be analyzed, which is a significant advantage compared with a microchannel detector used in a spatial separation spectrograph only.

In the spectrograph described hereinbefore, it is obvious that the means used may be replaced by equivalent means without passing beyond the scope of the invention.

For example, the monoblock light guide is not indispensible and in the spectrograph according to the invention separate light guides with optical fibers may be used, for example such as those employed in a spectrograph with a purely spatial separation.

What is claimed is:

1. A mass spectrograph providing a spatial analysis of a sample comprising: a pulsed ion source, means for analyzing the ions emitted by said source, said means being of the type combining magnetic separation and measurement of the time of flight, and a panoramic ion detector which collects all ions of different initial energies but having the same m/nq ratio.

2. A spectrograph according to claim 1, wherein the pulse source is a triggered laser source.

3. A spectrograph according to claim 1, wherein the said pulsed source is a sparked source.

4. A spectrograph according to claim 1, wherein the panoramic ion detector comprises an ion inlet diaphragm, means facing the diaphragm for converting ions into electrons, means facing the means for converting the ions into electrons and for converting electrons into photons, a photon detector facing the means for converting the electrons into photons, and photon guidance means located between the means for converting electrons into photons and the photon detector whereby the photon guidance means have a monoblock structure.

5. A spectrograph according to claim 4, wherein the guidance means with the monoblock structure are made from a colourless synthetic resin.

6. A spectrograph according to claim 5, wherein the synthetic resin is a methyl methacrylate polymer.

7. A spectrograph according to claim 4, wherein the said guidance means with a monoblock structure converge in the direction of a window located between the means for converting electrons into photons and the photon detector.

8. A spectrograph according to claim 4, wherein the means for converting ions into electrons have a plane symmetry structure.

9. A spectrograph according to claim 4, wherein the inlet diaphragms for the ions is at earth potential and the means for converting ions into electrons are at negative potential compared with the earth potential.

10. A spectrograph according to claim 9, wherein the means for converting ions into electrons are made from a copper-beryllium alloy.

11. A spectrograph according to claim 4, wherein the means for converting electrons into photons comprise a single scintillator with a planar structure.

12. A spectrograph according to claim 11, wherein the scintillator comprises a plastic support whose face which faces the ion-electron conversion means is aluminized.

13. A spectrograph according to claim 12, wherein the ion inlet diaphragm is at earth potential, and the scintillator is at positive potential compared with earth potential.

14. A spectrograph according to claim 4, wherein the photon detector is constituted by at least one photomultiplier.

15. A spectrograph according to claim 14, wherein the output signals from the photomultiplier are applied to means for recording and visualizing the spectrum of the photons.

16. A spectrograph according to claim 15, wherein the recording and visualization means comprise a cathode tube apparatus.

17. A spectrograph according to claim 15, wherein the recording means comprise a device for the time division of n channels corresponding to n masses and the storage of values of signals corresponding to n channels in n storage units.

* * * * *